Patented Aug. 9, 1932

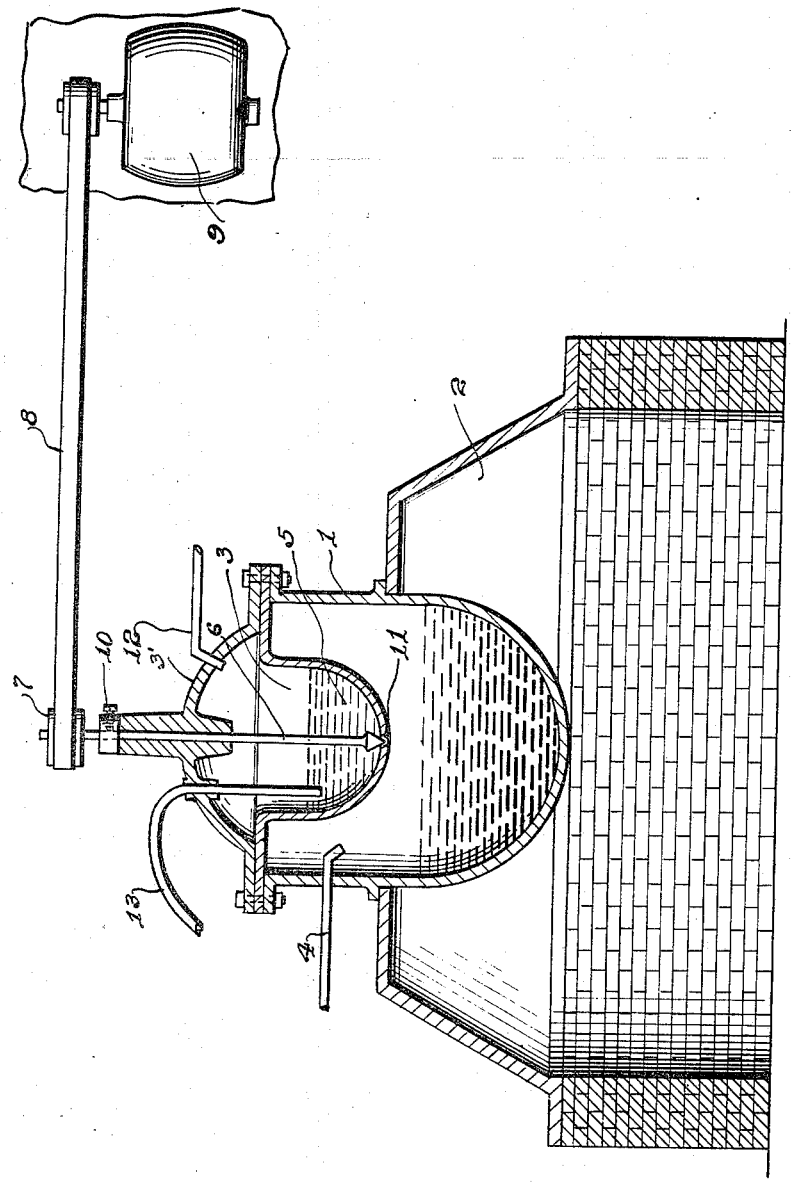

1,870,727

UNITED STATES PATENT OFFICE

ALBERT HARTZELL, OF YONKERS, AND FRANK H. LATHROP, OF GENEVA, NEW YORK, ASSIGNORS TO WALTER C. O'KANE, OF DURHAM, NEW HAMPSHIRE, AND PAUL MOORE, OF WASHINGTON, DISTRICT OF COLUMBIA, CHAIRMAN AND SECRETARY OF THE CROP PROTECTION INSTITUTE, OF WASHINGTON, DISTRICT OF COLUMBIA, AN ASSOCIATION

PROCESS AND APPARATUS FOR MAKING COLLOIDAL SUBSTANCES

Application filed August 16, 1924. Serial No. 732,523.

This invention relates to processes and apparatus for making colloidal materials, and more particularly colloidal sulphur.

In prior art processes, colloidal substances have been made by precipitation from solution, as almost the exclusive method of preparing them. Such methods require rather extensive manipulations. In the case of sulphur for example, it was necessary to change the sulphur into some other form and then precipitate it by an acid.

One of the objects of this invention is to prepare colloidal substances directly.

Another object of this invention is to supply apparatus particularly designed to carry out such processes.

Further objects and advantages of this invention will appear from the detailed description set forth below, it being understood that various departure from, and changes in, this disclosure may be made by those skilled in the art, without departing from the spirit and scope of this invention.

The description of the invention is to be considered in connection with the accompanying drawing wherein there is shown by way of illustration, in sectional elevation, an example of one form that the apparatus may take.

In its most fundamental aspect, this invention is based on the formation of colloidal substances, particularly colloidal solutions, by passing vapors or gases containing the substance to be produced in colloidal form, into a colloidizing material, preferably in liquid form. The invention will be illustrated by reference to processes for making colloidal sulphur, it being understood that this process is given by way of illustration and not by way of limitation.

In the apparatus shown in the drawing, a retort 1 set within a furnace or fireplace 2, for the purpose of heating the retort contains sulphur which is heated to produce vapors or fumes of the latter. The vapors produced in this retort then pass into the inner retort 3 provided with cover 3', where they are subjected to colloidizing conditions. The vapor from retort 1 may be formed by heating to a temperature sufficiently high to produce substantial vaporization, or a current of gas may be passed into the retort 1 as by pipe 4 either above or below the material in retort 1, to form and carry off the vapors therein. The vapors passing into retort 3 meet, preferably a colloidizing liquid 5 within which they are thoroughly diffused by the stirrer 6 operated by pulley 7, driven by belt 8 from motor 9, or in any other convenient manner. The stirrer arm preferably carries an adjustable collar 10 so that the size of the opening 11 may be varied, this opening being placed in the bottom preferably of retort 3. Any excess gas or vapor may pass off by pipe 12. A siphon 13 may be used for conducting away the colloidal solution formed.

The following example of using this apparatus for making solutions containing colloidal sulphur is given. Five parts of flowers of sulphur were placed in retort 1, and nitrogen gas was passed through the apparatus to drive out the air. The retort was then heated to form fumes of sulphur. After considerable fumes had formed nitrogen was again introduced to force the sulphur fumes over into the solution 5. This solution was made by dissolving 5 parts of fish oil soap in 50 parts of water. The nitrogen also serves in a mechanical way to agitate the soap and water solution. The nitrogen may be collected and used over again, or it may be circulated back through the apparatus. The colloidal solution was siphoned off from retort 3 through pipe 13. It contained about 5 pounds of sulphur to 100 gallons of solution.

While nitrogen has been specifically mentioned above, any gas preferably inert to the substance being colloidized may be used. Instead of using a gas to carry off the vapors into retort 3, a vacuum may be applied to pipe 12 for the same purpose. Or the vacuum may be used to draw the current of gas containing fumes of sulphur into the liquid. The colloidizing liquid may take various forms. In place of a soap solution, other colloidizing material such as glue, glycerine, gelatine, or gums may be used. If soap solution is used, it may be any sodium or potassium soap for example, and may be hot or cold. When the colloidal solution is to be used for insecticidal or fungicidal purposes, fish oil soap having itself insecticidal properties is to be preferred. Such soap solutions may vary widely in concentration as from 1 part to 100 parts of soap in 1000 parts of water.

When desired, the process although illustrated as a batch process, may be made continuous. A source of molten sulphur is used to maintain preferably a constant level of sulphur in retort 1. Similarly a source of colloidizing liquid maintains the latter in retort 3 while it is constantly withdrawn by siphon 13. If the concentration of colloid in solution 6 is not high enough, the solution is circulated back into retort 3. In this phase of the invention, the sulphur fumes are led into the colloidizing liquid from a pipe having a series of openings, a spray nozzle serving well for this purpose.

Having thus set forth our invention, we claim:

1. A colloidizing apparatus comprising a retort, a second retort within the first named retort, and a conduit to conduct vapors from the first retort into the second retort.

2. A colloidizing apparatus comprising a retort, a second retort adapted to contain a liquid within the first named retort, the second retort being provided with a stirrer and containing an opening communicating with the first retort, a pipe connected to the first retort for admitting a gas, a pipe for withdrawing gas from the second retort, and a siphon for removing liquid from the second retort.

3. A continuous process of making colloidal substances which comprises circulating a colloidizing liquid, and at a point in the circuit contacting vapors of a substance to be colloidized with the circulating liquid.

4. A continuous process of making colloidal substances which comprises maintaining a body of a substance to be colloidized in liquid condition, continually withdrawing vapors of such substance from the body thereof, and contacting such vapors with a circulating current of colloidizing liquid.

5. A colloidal apparatus comprising means for vaporizing a substance to be colloidized, means for introducing a current of gas into the vaporizing means to assist in carrying off the vapors formed therein, means for exposing said vapors to a colloidizing material, and means for conducting the vapors from the first-named means into the colloidizing material.

6. A colloid apparatus comprising means for vaporizing a substance to be colloidized, means for exposing said vapors to a colloidizing material, and means for conducting the vapors from the first-named means into the colloidizing material, and means for passing a current of inert gas through the apparatus to assist in carrying over the vapors formed in the first-named means.

7. A colloid apparatus comprising means for vaporizing a substance to be colloidized, means for exposing said vapors to a colloidizing material, means for conducting the vapors from the first-named means into the colloidizing material, and means for passing a current of nitrogen through the apparatus to assist in carrying over the vapors of the substance to be colloidized.

ALBERT HARTZELL.
FRANK H. LATHROP.